Sept. 16, 1969  T. J. WEBSTER  3,467,365
LIQUID VAPOUR CONTACT TRAY
Filed March 11, 1966  2 Sheets-Sheet 1

INVENTOR
THOMAS JOHN WEBSTER
BY Townshend & Meserole
ATTORNEYS

Sept. 16, 1969  T. J. WEBSTER  3,467,365
LIQUID VAPOUR CONTACT TRAY
Filed March 11, 1966  2 Sheets-Sheet 2
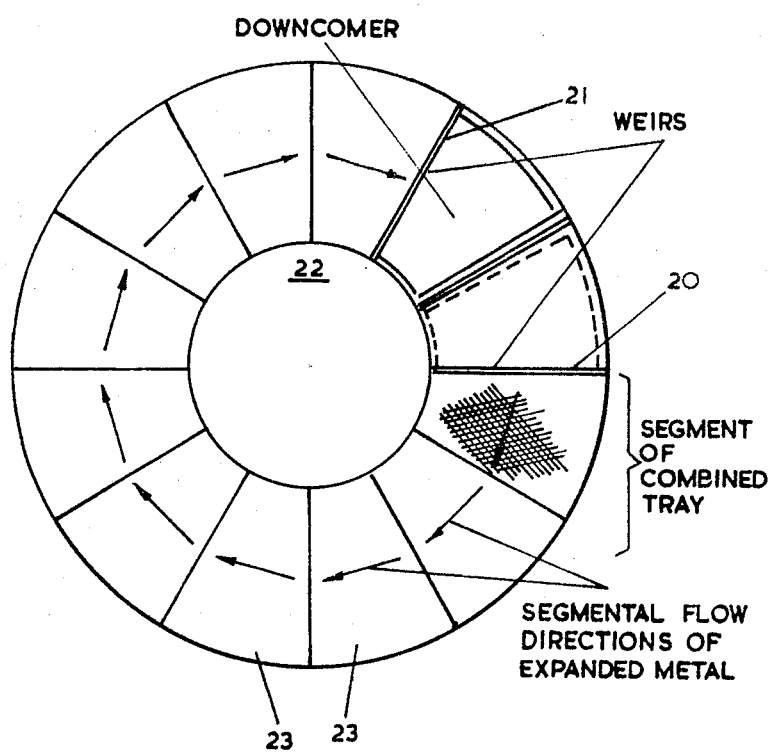
FIG. 3.
FIG. 4.
INVENTOR
THOMAS JOHN WEBSTER
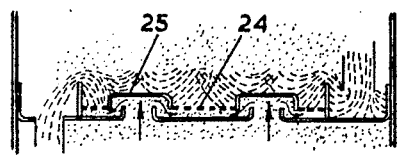
ATTORNEYS 3,467,365
LIQUID VAPOUR CONTACT TRAY
Thomas J. Webster, Ashford, England, assignor to The British Oxygen Company Limited, a British company
Filed Mar. 11, 1966, Ser. No. 533,493
Claims priority, application Great Britain, Mar. 15, 1965, 10,862/65
Int. Cl. B01d 3/22
U.S. Cl. 261—114                                   1 Claim

ABSTRACT OF THE DISCLOSURE

A liquid-vapour contact tray of the sieve tray type for use in a distillation column comprises a perforated plate having a liquid flow path from an inlet to an outlet, the plate being overlaid with a grid provided with a plurality of spaced slats positioned and angled so that when gas rises through the perforated plate, at least some of the gas issuing from the perforations is given a component of velocity along the liquid flow path towards the outlet.

---

This invention relates to liquid-vapour contact trays for use in distillation columns, and particularly but not exclusively for use in distillation columns in plants for the separation of air by low temperature liquefaction and distillation.

A form of liquid-vapour contact tray which is frequently used in disillation columns is the so-called sieve tray, which is a flat plate with a large number of perforations spaced over its area. In a distillation column such trays are disposed horizontally and are vertically spaced from one another in such a way that liquid descends the column by flowering over the surface of each tray from an inlet to an outlet, whilst vapour passes upwardly through the perforations and thence through the liquid on the tray. The inlets and outlets of the trays may be defined by weirs.

It is desirable in such a distillation column that a high propotrion of the sieve tray perforations should be active for vapour flow, and that the pressure drop through the trays should be as low as possible. In small trays all the perforations may be active, and the pressure drop will be correspondingly small. However it has been found that with large trays a portion of the tray may be inactive. The magntiude of this inactive area is found to be dependent upon the perforated tray area so that the greater the total perforated tray area, the greater is the area of inactivity. Such areas of inactivity may at the same time be associated with "weeping," that is to say liquid passing downwardly through the perforations and falling on the tray below. Moreover, as a result of incomplete tray activity, some of the perforations in the tray are not available for vapour uow and hence the total vapour flow is concentrated through a smaller number of perforations than the number which should theoretically be available. This results in an increased tray pressure drop, thus increasing the total pressure drop across the column. These effects become more and more pronounced as the size of the tray is increased.

The formation of these areas of inactivity in large trays is mainly due to the presence of comparatively high liquid heads which provide the pressure gradient for liquid flow. With trays of the type described, high liquid heads are inevitably associated with large sizes of trays. In the regions of high liquid head the flow of vapour through the perforations may be prevented by the opposing liquid pressure, and even where the vapour does penetrate into a region of high liquid head it tends to jet through the liquid and good liquid-vapour contact does not occur. Furthermore the mass of liquid associated with the large liquid head may give problems of instability due to surging of the liquid.

For trays in which the width of the tray path is constant, for example in the case of rectangular trays in which the liquid flows across the tray from an inlet weir to a parallel outlet weir, the liquid head at the inlet depends mainly upon the path's length. In the case of so-called annular sieve trays, in which the liquid follows a circular path around a central mandrel, there is an additional complication due to the effect of centrifugal force on the liquid, which tends to cause the liquid to collect the outer periphery of the tray, so that there are virtually two hydraulic gradients, a circumferential one and radial one. Similarly, for cases in which the width of the tray path is not constant, such as, for example, in the so-called chordal-weir trays, in which the inlet weir and the outlet weir form parallel chords at opposite sides of a circular tray plate, hydraulic gradients exist from the inlet to the outlet weir and also from the inlet to the circumference of the tray.

In order to reduce the hydraulic gradient and to render it more uniform, whereby localised inactive zones are eliminated, it has been proposed to impart in the liquid a component of velocity in the direction of the tray outlet. The means for doing so have included the provision in a sieve tray of apertures having obliquely inclined walls. The construction of such a tray is expensive compared with that of a perforated tray having apertures extending normally through the tray.

To reduce construction costs of a tray with inclined apertures, it has been proposed to fabricate the tray entirely from expanded metal, advantage being taken of the characteristic of the expanded metal that the apertures are inclined at an angle to the sheet. It has been found however that, particularly when used in air separation columns such trays tend to "weep."

An object of this invention is to provide simple and relative inexpensive means whereby an existing liquid-vapour contact tray of the sieve tray type can be modified to reduce the liquid gradient and increase efficiency in the liquid-vapour contact.

In this context—a liquid-vapour contact tray of the sieve tray type is intended to cover both the normal type of sieve tray in which the vapour passages consist solely of perforations and also those types in which there are provided bubble caps as well as perforations.

According to the present invention, a liquid-vapour contact tray of the sieve tray type for use in a distillation column having a liquid flow path from an inlet to an outlet comprises a perforated plate overload with a grid having spaced slats, and at least some of said slats are positioned and angled in such a way when gas is caused to rise through the tray, at least some of the gas issuing from the perforations is given a component of velocity along the liquid flow path towards the outlet.

In the case of sieve trays having bubble caps as well as perforations, the grid overlay has in its holes large enough to pass over the bubble cap so as to permit the overlay to rest on the perforated portions of the tray.

By virtue of its component of velocity along the liquid flow path, the vapour assists the liquid to flow towards the outlet and thus reduces the hydraulic gradient. Instead of inactive areas of the tray, and areas where jetting of the vapour otherwise occurs, a uniform foam can be achieved over the tray. In addition, the mass of liquid on the tray, and the consequent instability caused by liquid movements, are substantially reduced. It is found that the dry tray pressure drop due to the provision of the grid is negligible, and the increased efficiency of the trays allows the number of trays, and consequently the overall pressure drop, to be reduced.

In a preferred form, the said grid comprises a sheet of expanded metal, which is formed from sheet metal which is cut by a number of discontinuous parallel slits and then stretched so that the slits open up to form apertures. Such expanded metal is commercially available. The method of manufacture causes the metal slats which it comprises to be at an angle to the plane of the sheet. A form of expanded metal is obtainable which has been passed through flattening rolls; in this case the metal is nowhere at an angle to the sheet and consequently this does not constitute a grid within the scope of the invention. The apertures may have any suitable shape such as for example diamond, rectangular or square.

This invention may be carried into effect simply by fastening a sheet of expanded metal to the upper side of a sieve tray, positioned and orientated so that the metal slats will deflect some of the gas to give a component of velocity along the liquid flow path.

The expanded metal sheet may be fixed to the sieve plate by any suitable means such as tack-welding, brazing, or soldering, by the use of nuts and bolts, or by self tapping screws; alternatively it may be wired in place. It will be seen that the invention provides a simple method whereby existing sieve trays may be modified.

The invention will be more particularly described with reference to the accompanying drawing in which:

FIG. 3 shows a plan view of an annular sieve tray according to the invention, and FIG. 4 shows a diagrammatic sectional view of a sieve tray provided with bubble caps as well as perforations.

Figure 1:
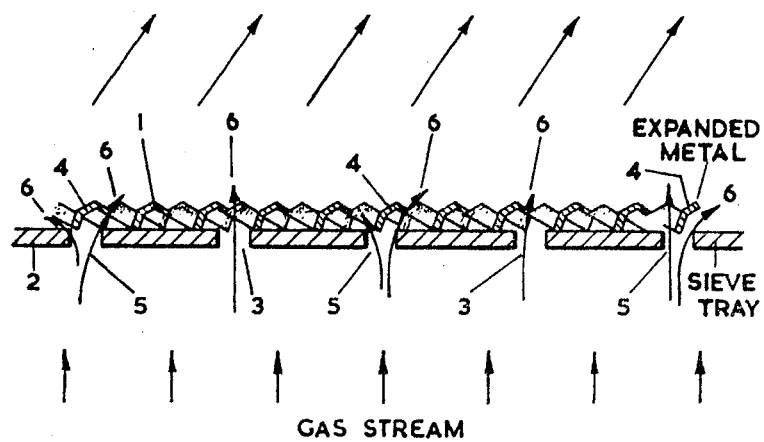
FIG. 1 shows a cross-section of a sieve tray according to the invention.

In FIG. 1 a grid in the form of a sheet of expanded metal 1 having apertures through it rests on a sieve tray 2 having perforation 3. As shown, the slats which make up the expanded metal sheet are disposed at an angle to the vertical and the sheet is so positioned that parts of the slats 4 are adjacent to alternate perforations 5. Gas leaving the perforations 5 is deflected by the slat parts 4 as shown by the arrows 6, whereby it is given a component of velocity towards the right hand side, this being the direction of liquid flow towards the outlet. Although only a proportion of the issuing gas is so deflected, this is enough to cause a liquid layer covering the sieve tray to flow towards the outlet, and to reduce the pressure gradient along the tray so that liquid heads at the inlet end are substantially reduced.

If the apertures of the expanded metal have the same pitch as the perforations of the sieve tray the grid has to be carefully positioned on the tray to ensure that the apertures and the perforations are correctly aligned in phase with one another to produce the required deflection of the issuing gas. If the apertures and perforations are out of alignment there would be a serious reduction in gas deflection because the gas would either pass straight through the apertures or hit the wrong part of the slats. If however the grid and sieve tray are constructed so that the apertures and perforations are of different pitch this accurate alignment is not necessary. This is because at least some of the apertures and perforations will be correctly aligned, and the overall gas deflection will be sufficient. Further advantages of having the apertures and perforations of different pitch are that it simplifies manufacture of the grid and sieve tray; and also that it produces better liquid gas turbulence while retaining sufficient gas deflection.

It is therefore preferable that the apertures in the expanded metal should not correspond in number or pitch to the perforations in the plate; in fact it has been found that benefit will derive from the invention even with considerable differences between the numbers of apertures in the expanded metal and the perforations in the sieve plate. For instance, in an air separation column fitted with sieve plates having 576 perforations per square foot (spaced 0.5 inch apart), improved results in accord with the stated object of this invention were achieved using overlying expanded metal sheet having from 144 to 2304 apertures per square foot.

Figure 2:
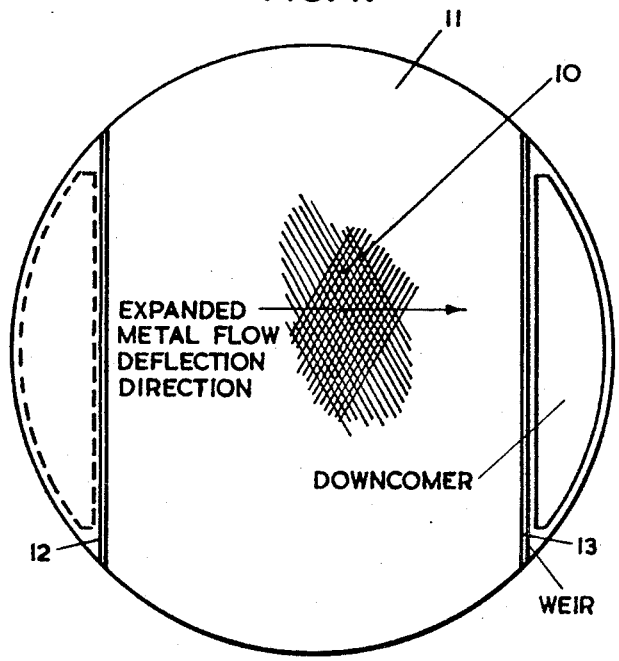
FIG. 2 shows a plan view of a chordal weir tray according to the invention.

FIG. 2 shows a plan view of a chordal weir tray. A single sheet of expanded metal 10 overlies the whole perforated part of the tray 11 between the chordal weirs 12 and 13, and is orientated so as to deflect gas rising through the tray so as to give it a component of velocity towards the outlet weir 13.

FIG. 3 shows a plan view of an annular sieve tray, which is designed so that a liquid layer on the tray flows around an annular path from an inlet weir 20 to an outlet weir 21, around a central mandrel 22. In this case segments of expanded metal sheet 23 are spaced around the flow path, each being oriented so as to deflect gas rising through the tray perforations so as to give a component of velocity in the circumferential direction. In this case ten such segments are used.

FIG. 4 shows a diagrammatic sectional view of a sieve tray having bubble caps 25 and a perforated plate 24 arranged so that vapour rises through the tray as shown by the arrows. The liquid descends onto the tray inlet, passes from right to left along the tray and then descends through the tray outlet to the next tray.

A grid (not shown) consisting of a single sheet of expanded metal has in its holes which are dimensioned and arranged so that the grid rests on the perforated plate 24 with the holes making an easy fit over the bubble caps 25. The construction of the grid and the way it rests on the perforated plate 24 is essentially the same as the arrangement illustrated in FIG. 1. The grid is orientated so that vapour rising through the tray is deflected towards the tray outlet on the left hand side.

While it is preferred that the expanded metal should cover all or nearly all the perforated area of the sieve tray, benefit can be obtained from the invention when only a part of the sieve tray is covered by the expanded metal sheet.

I claim:

1. A liquid vapour contact tray of the sieve tray type for use in a distillation column having a liquid flow path from an inlet to an outlet comprising a perforated plate overlaid with a grid having spaced slats wherein at least some of the spaced slats are positioned and angled so that when gas is caused to rise through the tray at least some of the gas issuing from the perforations is given a component of velocity along the liquid flow path towards the outlet, and wherein the grid comprises an expanded metal sheet provided with spaced slats which define a plurality of apertures in the expanded metal sheet.

References Cited

UNITED STATES PATENTS

| | | | |
|---|---|---|---|
| 1,108,853 | 8/1914 | Sewell. | |
| 2,629,654 | 2/1953 | Olney. | |
| 2,832,578 | 4/1958 | Gilmore. | |
| 2,868,696 | 1/1959 | Skinner. | |
| 2,877,099 | 3/1959 | Bowles. | |
| 3,156,746 | 11/1964 | Kittel. | |
| 3,362,696 | 1/1968 | Vaughn | 261—114 |

TIM R. MILES, Primary Examiner